United States Patent Office 3,567,585
Patented Mar. 2, 1971

3,567,585
PROCESS FOR OBTAINING BCG-CULTURES
Hubert Bloch, Basel, and Jakob Nuesch, Riehen, Switzerland, assignors to Ciba Corporation, New York, N.Y.
No Drawing. Continuation-in-part of applications Ser. No. 379,364, June 30, 1964, and Ser. No. 455,994, May 14, 1965. This application June 27, 1968, Ser. No. 740,478
Claims priority, application Switzerland, July 12, 1963, 8,736/63; May 26, 1964, 6,839/64; May 27, 1964, 6,913/64; Mar. 25, 1965, 4,203/65
Int. Cl. C12k 5/00
U.S. Cl. 195—96
3 Claims

ABSTRACT OF THE DISCLOSURE

Process for cultivating BCG on an industrial scale in a fermenter by using a nutrient solution containing glycerin and a wetting agent of the Tween type and processing of the BCG culture to obtain vaccines.

CROSS REFERENCES TO RELATED APPLICATIONS

This application is a continuation in part of our pending application Ser. No. 379,364, filed June 30, 1964, and of our pending application Ser. No. 455,994, filed May 14, 1965, both of which are now abandoned.

The present invention provides an industrial process for the manufacture of living cultures of *Mycobacterium tuberculosis*, especially of BCG cultures. The attenuated *Mycobaterium tuberculosis* var. BCG (Bacterium Calmette-Guérin) is used as an in-vivo vaccine for immunisation against tuberculosis. The vaccine is prepared from live BCG cultures, preferably by lyophilisation. BCG cell extracts likewise have a certain immunising action. For the manufacture of the vaccines and cell extracts on an industrial scale suitably large amounts of uniform and viable cell material should be available. Hitherto this has not been the case. Insofar as its cultivation is concerned BCG is very delicate; it has not been possible in the past to prepare BCG on an industrial scale in the conventional fermenters of stainless steel with aeration and stirring, since BCG at best developed only very slowly under these conditions.

The present invention is based on the observation that the composition of the nutrient solution—in particular insofar as the carbon sources and the addition of surface-active substances are concerned—and moderate aeration and stirring are of decisive importance in the industrial production of BCG.

It has been observed that a combination of glycerol as source of carbon and energy with wetting agents of the Tween type (see The Merck Index, 7th ed., p. 970 [1960]), more especially with Tween 80, ensures maximum growth of BCG in fermenters on an industrial scale (e.g., in 50 or 500 liter fermenters). The proportions of the two reactants depend on the other constituents of the nutrient solution. Glycerol is added in a concentration of at least 2%, for example 20 to 100 g. per liter of nutrient, the wetting agent in a concentration of at least 0.1%, for example 1 to 20 g. per liter. The other constituents of the nutrient solution, nitrogen sources, salts, trace elements, correspond substantially to the media described in literature for the cultivation of BCG. Aeration should be moderate, using about 0.1 to 0.5 volume of air per volume of nutrient solution per minute. Stirring should likewise be gentle, for example at about 50 to 100 revolutions per minute. The incubation temperature in the fermenters is advantageously 37° C. The inoculation in the fermenters is performed with shake cultures incubated for 6 to 9 days at 37° C., and the inoculation is carried out with 2 to 5 vol. percent of shake culture.

The growth of the culture is observed turbidimetrically, for example by measuring the light absorption at 655 m$\mu$ in a photoelectric colorimeter. The organisms is harvested at an optical density of 2 to 10, corresponding to about 1 to 5 g. of dry cell material per liter of culture solution; this density is reached after 5 to 15 days. For propagation in the higher fermenter stages (scale up) cultures of an optical density of 1 to 3 are used, such as are obtained after about 4 to 6 days' incubation.

When the desired density has been reached, the bacteria are isolated from the nutrient solution, for example on a centrifuge. For the preparation of BCG vaccines the bacterial material can be freeze-dried or worked up into cell extracts.

To be useful for the manufacture of vaccines, the BCG cultures must have as high as possible a content of living cells (in proportion to the total number of cells).

A good vaccine should have a maximum content of live cells in relation to the total number of germs. It is also necessary for the germs to stay alive for a long period (storability of the vaccine) and that they should lend themselves well to resuspension. These requirements are difficult to satisfy because BCG is sensitive to temperature and especially to conditions such as are set up in freeze drying and storing the vaccine.

To increase the stability of the lyophilized vaccine there are added to the BCG suspension prior to its lyophilisation various protective substances, but it has not yet been fully established how exactly they act. According to Greaves (Ann. N.Y. Acad. Sci., 85 [1960], pp. 723–728) the BCG sediment is suspended in a "drying medium" containing a vehicle for example dextran, to achieve a spongy cake, a "buffer substance" to regulate the water content of the dried germs, for example sucrose or sodium glutamate, and a "neutralizing agent" for carbonyl groups, for example sodium glutamate.

The freezing temperature, the speed of freezing and the drying temperature likewise have an influence on the viability of the lyophilized cells.

It has also been proposed (cf. German specification 1,148,038 granted June 28, 1961 to Glaxo Laboratories Limited, Greenford, Middlessex) to increase the stability of the lyophilized vaccine by cultivating BCG in a nutrient medium which is free from substances containing carbonyl groups or compounds convertible into carbonyl groups by BCG, especially in a medium that is free from glycerin, monosaccharides, sugar alcohols and polysaccharides. The process has, however, the disadvantage that BCG grows less well in the nutrient media to be used and that the cultivation cannot be performed on an industrial scale in the fermenters conventionally used by industry for cultivating micororganisms.

In order to obtain stable living cultures, there are preferably used as starting materials for the above process cultures obtained by submitting a BCG culture to the conditions of the manufacture and storage of the vaccine and selecting the single cell-cultures which resist these conditions best. Thus, for example, in the manufacture of lyophilized BCG vaccines, an aqueous BCG suspension is lyophilized in the presence of a sugar-containing trying medium at a temperature of at least $-15°$ C., the lyophilisate stored for a considerable length of time, for example about 8 days to six months, at a temperature from about 20 to 50° C., for example 1 to 6 months at 30 to 40° C. or, for example, 8 days at 50° C., then suspended in water or an aqueous solution, the suspension plated onto a solid nutrient medium in such concentration that the colonies grow separately, some individual cell colonies of monocellular origin, for example about 10–20, are propagated separately in a liquid medium, the resulting cultures of monocellular origin so obtained are lyophilized under the same conditions as before, each lyophilisate resuspended in water or an aqueous solution and the suspension inoculated onto a solid nutrient substrate in order to determine the survival rate for each of the cultures of monocellular origin and the suspension with a survival rate of 80–100% selected and cultivated on a larger scale in fermenters using a nutrient medium that contains glycerol and a wetting agent of the Tween type as above defined.

It has been found that about 10 to 100 monocellular colonies are required for the selection of thermostable monocellular cultures. A resulting thermostable strain with good immunising properties may be used for manufacturing BCG cultures or vaccines until a degeneration in the properties becomes evident.

The lyophilization of the BCG cultures is carried out in a suitable "drying medium," preferably in an aqueous solution of dextran, glutamate and a sugar, for example saccharose, or a natural hexose such as glucose, lactose or fructose. About 1 g. of bacteria dry weight per liter of "drying medium" is used. The best drying medium has been found to be a solution of 5% of dextran, 5% of sodium glutamate and 5% of saccharose in distilled water; almost equally good is a solution of 5% dextran, 2% of sodium glutamate and 5% of glucose in distilled water. The following Table 1 shows the survival rate (ratio of the number of live germs per ml. after lyophilization to the number of live germs per ml. before lyophilization) in percent, referred to medium 1=100%.

TABLE 1

| Drying medium: | Percent relative survival rate |
|---|---|
| 1 | 100 |
| 2 | 92 |
| 3 | 58 |
| 4 | 1 |
| 5 | 15 |
| 6 | 0 |

1=5% dextran, 5% sodium glutamate, 5% saccharose, dist. water to make up 1 liter 2=5% dextran, 2% sodium glutamate, 5% glucose, dist. water to make up 1 liter 3=5% dextran, 2% sodium glutamate, 3% lactose, 2% glucose, 2% fructose, dist. water to make up 1 liter 4=3% dextran, 3% sodium glutamate, 0%, dist. water to make up 1 liter 5=0% dextran, 2% sodium glutamate, 8% saccharose, 5% albumin fraction V, dist. water to make up 1 liter 6=0% dextran, 0% sodium glutamate, 3% glycerin, 5% albumin fraction V, dist. water to make up 1 liter The bacterial suspension to be lyophilized is rapidly deep-frozen at about −50° C. (temperature drop about 1 to 4° C. per minute). The drying temperature is advantageously −15° to −20° C. (under 0.02 mm. Hg pressure). Within this temperature range the survival rate is about 100 times greater than at −30° C.

The lyophilisate is further dried over silica gel under 0.02 mm. Hg pressure. The final water content of the dried BCG is 1 to 2%.

The dried bacterial substance is stored under the most exacting conditions that may occur in the storing of the vaccine, for example at a temperature from 30° to 40° C., for a prolonged period, for example for 6 months, or for shorter at a temperature of 50° C. at the most.

To select from the resulting bacterial material those mutants which are most stable with regard to lyophilization and storage, it is suspended again, for example in an 0.25% solution of "Bovin Albumin Fraction V" (makers Pentex Inc., Kankakee, Ill., U.S.A.) and seeded on solid nutrient substrates, for example Loewenstein-Jensen agar. The concentration of the suspension used for seeding should be chosen so that the colonies grow separately.

The plates are incubated in the usual manner at 37° C. A number (for example 10 to 20) of the resulting monocellular colonies is individually transferred to shaking flasks with a liquid nutrient medium and incubated at 37° C. until the cultures have grown well (optical density at 655 m$\mu$, measured in a photoelectric colorimeter, 0.5 to 0.8, corresponding to a cell dry weight of 0.25 to 0.4 g. per liter of culture solution). For the purpose of homogenisation the cultures are then used to inoculate fresh identical nutrient solutions (5 vol. percent of culture for every new shaking culture) and allowed to grow to a cell dry weight of 0.5 to 0.75 g. per liter of culture solution (optical density 1.0 to 1.5). Each batch is then centrifuged, the sediment is washed, for example with a 0.05% solution of Albumin Fraction V, the individual monocellular culture sediment suspended in the previously used drying medium and one part of each suspension is seeded on a solid nutrient medium (Loewenstein-Jensen agar), whereas another portion is first lyophilized, resuspended and a comparable quantity of the suspension then seeded on the solid nutrient medium as described above. Incubation then reveals that the survival rates of the individual monocellular cultures differ very much (cf. Table 2):

TABLE 2

| Mono-cellular culture Number: | Number of colonies [1] | Number of colonies [2] | Survival rate in percent |
|---|---|---|---|
| 1 | $1.03 \cdot 10^8$ | $1.04 \cdot 10^8$ | 100 |
| 2 | $9.0 \cdot 10^7$ | $3.24 \cdot 10^7$ | 40 |
| 3 | $7.8 \cdot 10^7$ | $7.0 \cdot 10^6$ | 8 |
| 4 | $8.6 \cdot 10^7$ | $5.44 \cdot 10^7$ | 52 |
| 5 | $4.8 \cdot 10^7$ | 0 | 0 |
| 6 | $1.47 \cdot 10^8$ | $1.46 \cdot 10^8$ | 100 |
| 7 | $1.07 \cdot 10^8$ | $1.06 \cdot 10^8$ | 99 |
| 8 | $1.03 \cdot 10^8$ | 0 | 0 |
| 9 | $1.16 \cdot 10^8$ | $1.50 \cdot 10^6$ | 1 |

[1] Per ml. before lyophilisation.
[2] Per ml. after lyophilisation.

The monocellular cultures that display a high survival rate are cultures produced by a genotypical, thermostable mutant of the BCG strain. When cultivated, such cultures produce a large proportion of live cultures stable to lyophilisation and storing, which are particularly suitable for the production of lyophilized vaccines. The selected cultures display in animal tests the same, high immunizing effect as achieved with unlyophilized, fresh live cultures.

The vaccines obtained are characterized by a high percentage of living cells (viable units). They can be stored for several months at 40° C. without losing their good immunizing activity.

The activity can, for instance, be tested in mice infected with a virulent strain of *Myc. tuberculosis*, cf. Table 3 in the example. The vaccine can be used in the immunization of human-beings against virulent strains of *Myc. tuberculosis*. For clinical purposes for instance $1 \cdot 10^6$ to $7 \cdot 10^6$ living germs per dose should be used.

The following examples illustrate the invention.

EXAMPLE 1

A 50-liter fermenter (of the type conventionally used in the production of antibiotica) equipped with air sparger, stirrer and temperature governor is charged with 30 liters of nutrient solution which contains, per liter, the following constituents:

Glycerol—75.0 g.
Tween 80—2.0 g.
Albumine solution, 5% strength—50.0 ml.
L-asparagine—2.0 g.
Bacto-Casiton—1.0 g.
Primary potassium phosphate—1.0 g.
Sec. sodium phosphate $12H_2O$—2.5 g.
Ferriammonium citrate—10.0 mg.
Magnesium sulfate $7H_2O$—10.0 mg.
Calcium chloride $6H_2O$—0.5 mg.
Zinc sulfate $7H_2O$—0.1 mg.
Copper sulfate $5H_2O$—0.1 mg.
Deionised water, to make 1000 ml.

Before being poured into the fermenter, and without adding the albumine solution, the nutrient solution is heated for 20 minutes at 120° C. under 1.2 atmospheres (gauge) pressure in an autoclave, and then the albumine solution is added, which has been deactivated at 56° C. on two successive days and filtered through a Seitz filter. The fermenter is inoculated with 900 ml. of a BCG culture which has been grown for 9 days in 500 ml. Erlenmeyer flasks with 100 ml. nutrient solution each on a rotary shaking machine, and which has an optical density of 0.3 to 0.4 (measured at 655 mµ). (The nutrient solution in the Erlenmeyer flasks corresponds to the above nutrient, but instead of 50 ml. it contains 100 ml. of albumine solution per lite but no glycerol and no Tween.) Cultivation is performed at 37° C., aerating with 0.25 volume of air per volume of nutrient solution per minute and stirring with a 6-blade turbin impeller at 50 revolutions per minutes.

After 10 days the culture solution has an optical density of 4.40 (measured at 655 mµ), that is to say it contains about 2.2 g. of dry cell material per liter of culture solution.

When a nutrient solution is used which contains instead of glycerol 75 g. of glucose, all other conditions being identical, the optical density measured after 10 days is 0.13; when the nutrient solution contains no glycerol and only 0.5 g. of Tween and 100 instead of 50 ml. of albumine solution per liter, the optical density reached after 10 days is 0.02.

EXAMPLE 2

Under the conditions described in Example 1 a BCG culture is grown in a 50-liter fermenter in 30 liters of a nutrient solution which contains per liter:

Glycerol—50.0 g.
Tween 80—15.0 g.
Sodium acetate—1.0 g.
L-asparagine—2.0 g.
Bacto-Casiton—1.0 g.
Difco yeast extract—3.0 g.
Primary potassium phosphate—1.0 g.
Sec. sodium phosphate $12H_2O$—2.5 g.
Ferriammonium citrate—10 mg.
Magnesium sulfate $7H_2O$—10 mg.
Calcium chloride $6H_2O$—0.5 mg.
Zinc sulfate $7H_2O$—0.1 mg.
Copper sulfate $5H_2O$—0.1 mg.
Deionised water, to make 1000 ml.

The solution is heated for 20 minutes at 120° C. under 1.2 atmospheres (gauge) pressure in an autoclave.

After 10 days the culture solution has an optical density of 5.65 (measured at 655 mµ), corresponding to about 2.8 g. of dry cell material per liter.

When a nutrient solution is used that contains instead of glycerol and Tween 10.0 g. of glucose and 15.0 g. of Triton (WR1339), the optical density measured after 10 days is 0.27.

EXAMPLE 3

A 50-liter fermenter containing 30 liters of the nutrient solution mentioned in Example 2 is inoculated with 900 ml. of a shake culture grown in Erlenmeyer flasks as described in Example 1, in a nutrient solution composed as defined in Example 2. After 4 to 6 days' incubation of the fermenters 15 liters each of the culture solution are transferred with 300 liters of nutrient solution into 500-liter fermenters of the same type as the 50-liter fermenters. The cultures are grown at 37° C. while being aerated with 0.1 to 0.5 volume of air per volume of nutrient solution per minute and while being stirred at 100 revolutions per minute. After 7 days' incubation the optical density is 4 to 6, corresponding to 2 to 4 g. of dry cell material per liter of culture solution. The yield can be substantially improved by extending the cultivating period.

EXAMPLE 4

In preparing the suspensions for ampouling and lyophilization a culture obtained according to the preceding examples is cooled to 4° C. and centrifuged in a continuously operating centrifuge. The resulting BCG sediment is washed with a sterile 0.05% albumin solution ("Bovin Albumin Fraction V," made by Pentex Inc., Kankakee, Ill.).

Injectable suspensions are obtained when the washed BCG sediment is suspended, for example in a physiological sodium chloride solution.

To obtain lyophilized ampoules, the washed sediment (corresponding to 1 g. of BCG dry weight) is suspended in a "drying medium" prepared by taking 50 g. of dextran, 50 g. of sodium glutamate, and 50 g. of saccharose, and making up the mixture to 1 liter with distilled water, heating the batch at 90° C. until complete dissolution is achieved, cooling it to about 30° C. and filtering it through a Seitz filter for sterilization. The suspension is then filled into ampoules (content of the ampoules, for example, 1 mg. BCG dry weight). At the rate of 1 to 4°/min. the ampoules are then cooled to −50° C., placed into a freeze-drier, and lyophilized at −15 to −20° C. under a pressure of 0.02 mm. Hg. In a desiccator with silica gel, evacuated with a diffusion pump, the ampoules are subjected to a secondary drying operation under a pressure of 0.02 mm. Hg, then gassed with chemically pure, anhydrous nitrogen, and sealed. The final water content of the vaccine is 1 to 2%.

EXAMPLE 5

To prepare living cultures suitable especially for the preparation of stable lyophilized vaccines having a high number of living cells and being easily resuspended, a starting material is used which is prepared as follows:

A BCG sediment, washed with a sterile 0.05% albumin solution Fraction V, is suspended as described in Example 4 in a "drying medium" (optical density 0.4 to 0.6 at 655 mµ), and lyophilized under the conditions stated. The lyophilizate is stored for 6 months at 37° C. and then re-suspended in a 0.25% solution of Albumin Fraction V. The suspension is plated on Loewenstein-Jensen plates in Petri dishes in such manner that a maximum of 100 colonies grow in each Petri dish. The plates are incubated at 37° C. for 4 to 6 weeks. Nine of the resulting cell colonies of monocellular origin are transferred into 100 ml. of nutrient solution each, for example into the glycerine-containing solution of Example 2, which is contained in 500 ml. Erlenmeyer flasks, and incubated on a rotary shaker at 120 r.p.m. at 37° C. until the optical density at 655 mµ is 0.5 to 0.8. 5 vol. percent of each culture are then transferred into fresh shaking flasks containing the same nutrient solution (to obtain a homogenous culture), allowed to grow until an optical density of 1.0 to 1.5 is attained, then centrifuged, and the sediment washed with 0.05% solution of Albumin Fraction V. A suspension is prepared in the above drying medium, and 0.5 ml. thereof is plated on Loewenstein-Jensen plates, whereas the rest is lyophilized in ampoules under the conditions described in Example 4 and then resuspended in an adequate amount of sterile distilled water, and 0.5 ml. each is plated on Loewenstein-Jensen plates. After incubation of the plates at 37° C. for 4 to 6 weeks, the rate of survival, i.e. the proportion of the number of living cells after the lyophilization to the number of living cells before lyophilization is determined. It differs very much from one monocellular culture to another, cf. Table 2, col. 4.

The monocellular cultures Nos. 1, 6 and 7 display a practically 100% survival rate, and are used as starting material for the cultivation of BCG in fermenters or shaking flasks. Thus the content of ampoule No. 1 is seeded on Loewenstein-Jensen plates, incubated at 37° C., and the culture thus obtained is suspended in a 0.25% solution of Albumin Fraction V. This suspension is used for inoculating 500 ml. conical flasks each containing 100 ml. of the above nutrient solution. The inoculation amount is 1 vol. percent. In this manner there is produced on a rotating shaking machine 1.5 liters of a 9-day old culture having an optical density of 0.4 to 0.6 at 655 m$\mu$. These 1.5 liters are used to inoculate 30 liters of nutrient solution contained in a 50-liter fermenter as described in Example 1. When the culture has an optical density of 4.40 at 655 m$\mu$ it is centrifuged, washed and processed to form vaccines as described above.

The contents of ampoules Nos. 6 and 7 are used for inoculating 500 ml. shaking flasks as described above. The two live cultures so obtained are also processed to vaccines.

Table 3 below shows the results of a comparison in respect of thermostability of the vaccines obtained according to the invention from cultures Nos. 1 (fermenter) and 6 and 7 (shaking flasks) with vaccines obtained from the BCG starting strain but without selection. 5 ampoules each containing 1 mg. of BCG dry weight are stored for one week at 50° C. Before and after storage the content of viable units capable of forming colonies is determined. The figures shown are averages from the 5 ampoules.

TABLE 3

| BCG strain | Number of colonies/mg. BCG dry weight | | Survival rate in percent |
|---|---|---|---|
| | Without storage | After storage | |
| Selection No. 1, fermenter | $1.30 \cdot 10^8$ | $1.62 \cdot 10^6$ | 1.25 |
| Selection No. 6, shaking flask | $3.98 \cdot 10^7$ | $6.92 \cdot 10^5$ | 1.74 |
| Selection No. 7, shaking flask | $5.94 \cdot 10^7$ | $7.5 \cdot 10^5$ | 1.26 |
| Basic strain | $1.84 \cdot 10^7$ | $2.31 \cdot 10^4$ | 1.13 |

Table 4 shows the immunizing effect of the above vaccines in comparison with those of a fresh BCG culture. White mice were used as experimental animals. The contents of the ampoules with 1 mg. of BCG dry weight were suspended in 3 ml. of distilled water to which 0.3% of Tween 80 had been added, and the suspension further diluted with physiological sodium chloride solution to a concentration of 10$\gamma$ or 1$\gamma$ BCG/0.1 ml. Groups of twenty mice each per experimental unit were inoculated subcutaneously with 1 ml. of a suspension containing 1$\gamma$ or 10$\gamma$ of BCG dry weight. Four weeks after inoculation the animals were inoculated intravenously with a lethal dose (0.4 ml. with 300,000 viable units) of the bovine strain Ravenel of *M. tuberculosis*. The median survival time was determined. Animals not vaccinated died on an average 20 days after infection.

TABLE 4

| Vaccine | Median survival time, per 20 mice | |
|---|---|---|
| | 1$\gamma$ BCG/ mouse | 10$\gamma$ BCG/ mouse |
| Selection No. 1, fermenter, days | 24 | 43 |
| Selection No. 6, shaking flask, days | 35 | 39 |
| Selection No. 7, days | 26 | 36 |
| Fresh BCG culture, about 20-30$\gamma$ BCG dry weight | 39 days | |

What is claimed is:

1. Process for obtaining BCG cultures by cultivating BCG under aerobic conditions in a nutrient solution containing a source of carbon and of nitrogen, and inorganic salts, wherein as starting material a culture is used which is obtained by submitting a BCG culture to the conditions of the manufacture and storage of the vaccine and selecting the single-cell cultures which resist these conditions best and the cultivation is performed in a fermenter with the use of a nutrient solution containing at least 2% of glycerine as source of carbon and of energy in addition to at least 0.1% of a wetting agent of the polyoxyethylene sorbitan fatty acid ester type.

2. A process as claimed in claim 1, wherein a BCG culture is lyophilized, the lyophilisate stored for a considerable time at the probable highest storage temperature of the vaccine, then suspended in an aqueous solution, the suspension plated on a solid nutrient medium in such a concentration that separate colonies grow, a few single-cell colonies are propagated separately in a liquid medium, the single-cell cultures so obtained are lyophilized and in order to determine the rate of survivals a few ampoules of each single-cell culture are plated on a solid medium, and the single-cell cultures having the highest rate of survivals are used as starting material.

3. A process as claimed in claim 2, wherein the lyophilisate is stored for 8 days to 6 months at temperatures from at the most 50° C. down to 20° C.

References Cited

UNITED STATES PATENTS 3,135,663    6/1964    Muggleton _____ 424—92

FOREIGN PATENTS 643,834    6/1962    Canada _____ 167—79

OTHER REFERENCES

Difco Laboratories, No. 141, April 1955, booklet entitled: *Mycobacterium Tuberculosis:* Isolation, Identification, Sensitivity Testing, pp. 12–18 relied on.

Brtish Medical Journal, Oct. 1, 1960, pp. 979–986.

LIONEL M. SHAPIRO, Primary Examiner

U.S. Cl. X.R.

424—92